(12) United States Patent
Nagao et al.

(10) Patent No.: US 10,350,581 B2
(45) Date of Patent: Jul. 16, 2019

(54) CATALYST COMPOSITION FOR EXHAUST GAS PURIFICATION AND CATALYST FOR EXHAUST GAS PURIFICATION

(71) Applicant: Mitsui Mining & Smelting Co., Ltd., Tokyo (JP)

(72) Inventors: Yuki Nagao, Saitama (JP); Michitaka Yamaguchi, Saitama (JP); Yunosuke Nakahara, Saitama (JP); Masato Machida, Kumamoto (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 91 days.

(21) Appl. No.: 14/654,985

(22) PCT Filed: Nov. 27, 2013

(86) PCT No.: PCT/JP2013/081888
§ 371 (c)(1),
(2) Date: Jun. 23, 2015

(87) PCT Pub. No.: WO2014/103597
PCT Pub. Date: Jul. 3, 2014

(65) Prior Publication Data
US 2015/0352530 A1    Dec. 10, 2015

(30) Foreign Application Priority Data

Dec. 27, 2012 (JP) .................. 2012-285200

(51) Int. Cl.
*B01D 53/94* (2006.01)
*B01J 23/50* (2006.01)
*B01J 23/72* (2006.01)
*B01J 23/75* (2006.01)
*B01J 23/83* (2006.01)
*B01J 23/86* (2006.01)
*B01J 23/89* (2006.01)
*B01J 35/00* (2006.01)
*B01J 35/02* (2006.01)
*B01J 35/04* (2006.01)
*B01J 37/34* (2006.01)
*B01J 23/745* (2006.01)
*B01J 23/755* (2006.01)
*B01J 23/889* (2006.01)

(52) U.S. Cl.
CPC .......... *B01J 23/894* (2013.01); *B01D 53/944* (2013.01); *B01D 53/945* (2013.01); *B01J 23/50* (2013.01); *B01J 23/72* (2013.01); *B01J 23/745* (2013.01); *B01J 23/75* (2013.01); *B01J 23/755* (2013.01); *B01J 23/83* (2013.01); *B01J 23/868* (2013.01); *B01J 23/8892* (2013.01); *B01J 35/002* (2013.01); *B01J 35/026* (2013.01); *B01J 35/04* (2013.01); *B01J 37/349* (2013.01); *B01D 2255/104* (2013.01); *B01D 2255/2065* (2013.01); *B01D 2255/2073* (2013.01); *B01D 2255/20715* (2013.01); *B01D 2255/20738* (2013.01); *B01D 2255/20746* (2013.01); *B01D 2255/20753* (2013.01); *B01D 2255/20761* (2013.01); *B01D 2255/9207* (2013.01); *F01N 2510/06* (2013.01); *Y02T 10/22* (2013.01)

(58) Field of Classification Search
CPC ....... B01J 23/76; B01J 23/894; B01D 53/944; B01D 53/945
See application file for complete search history.

(56) References Cited

U.S. PATENT DOCUMENTS

| | | | | | |
|---|---|---|---|---|---|
| 3,842,158 | A | * | 10/1974 | Hansford et al. .... | B01D 53/945 423/213.5 |
| 5,063,193 | A | * | 11/1991 | Bedford ............... | B01D 53/945 423/213.2 |
| 2007/0238605 | A1 | * | 10/2007 | Strehlau ............... | B01D 53/944 502/60 |
| 2015/0005160 | A1 | * | 1/2015 | Nitta ...................... | B01J 37/03 502/304 |

FOREIGN PATENT DOCUMENTS

| | | | | |
|---|---|---|---|---|
| CN | 101767015 | A | * 7/2010 | ............ B01J 23/889 |
| JP | 61-086944 | | 5/1986 | |
| JP | 4275922 | A2 | 10/1992 | |
| JP | 09-141102 | | 6/1997 | |
| JP | 09225267 | | 9/1997 | |

(Continued)

OTHER PUBLICATIONS

International Search Report dated Mar. 11, 2014 filed in PCT/JP2013/081888.

(Continued)

*Primary Examiner* — Melvin C. Mayes
*Assistant Examiner* — Michael Forrest
(74) *Attorney, Agent, or Firm* — Rankin, Hill & Clark LLP

(57) ABSTRACT

The invention relates to a catalyst composition using other metals different from precious metals as a catalytically active component and is to propose a novel catalyst composition for exhaust gas purification which has excellent catalytic activity, in particular, excellent treatment activity of HC even after a thermal durability treatment. The invention is to propose a catalyst composition for exhaust gas purification comprising catalyst particles having a constitution in which Cu and a transition metal A including at least one of Cr, Fe, Mn, Co, Ni, Zr, and Ag are supported on ceria ($CeO_2$) particles and a catalyst using the same.

20 Claims, No Drawings

(56) References Cited

FOREIGN PATENT DOCUMENTS

| JP | 10502020 T2 | 2/1998 | |
|---|---|---|---|
| JP | 10128118 A * | 5/1998 | ............. B01J 23/70 |
| JP | 10151348 A2 | 6/1998 | |
| JP | 10-180103 | 7/1998 | |
| JP | 2005087963 A2 | 4/2005 | |
| JP | 2007179963 A * | 7/2007 | ............. H01M 4/88 |
| JP | 2008156130 A2 | 7/2008 | |
| JP | 2009138591 A2 | 6/2009 | |
| JP | 2011140011 A2 | 7/2011 | |
| WO | 199611740 A1 | 4/1996 | |
| WO | WO 2013108424 A1 * | 7/2013 | ........... B01D 53/944 |

OTHER PUBLICATIONS

Hinokuma, Satoshi. et al., "Preparation of Pd—M (M=Fe, Co, Ni, Cu) Binary Supported Catalyst by Arc-Plasma Process," Dai 108 Kai Shokubai Toronkai Toronaki A Yokoshu, 2011, p. 152.; Cited in International Search Report.
Yamashita, N. et al., "Structure and catalytic properties of transition metals supported on $CeO_2$ prepared by arc-plasma," Rare Earths No. 62, 2013, pp. 64-65.; Cited in International Search Report.
Yamashita, Noriko. et al., "Preparation of Supported Non-PGM Composite Nanoparticles by Arc-Plasma Process and Property of Catalyst Thereof," Dai 122 Kai Shokubai Toronkai Toronkai A Yokoshu, 2013, p. 342.; Cited in International Search Report.
Japanese Notice of Allowance dated Jul. 4, 2017 issued in the corresponding Japanese patent application No. 2013-554495.

* cited by examiner

CATALYST COMPOSITION FOR EXHAUST GAS PURIFICATION AND CATALYST FOR EXHAUST GAS PURIFICATION

TECHNICAL FIELD

The present invention relates to a catalyst which can be used for purifying an exhaust gas to be discharged from an internal-combustion engine such as a gasoline engine and a diesel engine of two-wheel or four-wheel automobiles and a catalyst composition used in the catalyst.

BACKGROUND ART

An exhaust gas of automobiles which use gasoline for fuel contains hazardous components such as hydrocarbon (THC), carbon monoxide (CO), and nitrogen oxide (NOx). Therefore, it is necessary to purify each of the hazardous components in such a manner that the hydrocarbon (THC) is converted into water and carbon dioxide by oxidation; the carbon monoxide (CO) is converted into the carbon dioxide by oxidation; and the nitrogen oxide (NOx) is converted into nitrogen by reduction.

As a catalyst (hereinafter, referred to as an "exhaust gas purification catalyst") adapted to treat these exhaust gases, three way catalysts (TWC) capable of oxidizing and reducing CO, THC, and NOx have been used.

Three way catalysts are known, in which a precious metal is supported on a refractory oxide porous material having a high-specific surface area, for example, an alumina porous material having a high-specific surface area and the precious metal is supported on a substrate, for example, a monolithic substrate made of a refractory ceramic or metallic honeycomb structure or on refractory particles.

On the other hand, the exhaust gas discharged from the diesel engine contains sulfate salts based on sulfur content in a fuel, tar-like particulate matters (referred to as "PM") derived from incomplete combustion, nitrogen oxide (NOx) or the like.

As an apparatus for removing the PM contained in the exhaust gas discharged from the diesel engine, an exhaust gas purification apparatus, which collects the PM in a diesel particulate filter (referred to as a "DPF") and burns the collected PM at an appropriate timing to remove it, has been known.

Usually, this DPF is configured such that a porous filter substrate with a honeycomb structure forms a skeleton to collect the PM in a surface of a partition wall of the substrate when the exhaust gas flows inside the partition wall.

In both of a catalyst for purifying the exhaust gas discharged from the gasoline engine and a catalyst for purifying the exhaust gas discharged from the diesel engine, conventionally, expensive precious metals such as platinum (Pt) or rhodium (Rh) have been used as a catalytically active component in many cases. However, these precious metals are very expensive due to a small amount of reserves and suffer sharp fluctuations in price depending on changes in demand. Therefore, a catalyst, in which the expensive precious metals are not used or precious metal usage is reduced using other metals different from the precious metals, has been actively developed.

For example, Patent Document 1 (JP 2011-140011 A) discloses a CO oxidation catalyst which is obtained in such a manner that Pd is supported on $CeO_2$ carrier particles and a heat treatment is carried out at a temperature in the range of 850 to 950° C. under an oxidizing atmosphere, the CO oxidation catalyst exhibiting CO oxidation activity at a wide temperature range including a low temperature.

Patent Document 2 (JP 2008-156130 A) discloses a catalyst for exhaust gas purification which is obtained by supporting a delafossite-type oxide of 3R type represented by a general formula ABOx (wherein A represents at least one selected from the group consisting of Cu, Ag, Pd, and Pt; and B represents at least one selected from the group consisting of Al, Cr, Ga, Fe, Mn, Co, Rh, Ni, In, La, Nd, Sm, Eu, Y, and Ti) on a carrier made of ceramics or metallic materials, the catalyst for exhaust gas purification having high oxygen storage capacity from a low temperature range to a high temperature range without requiring the presence of a precious metal.

Patent Document 3 (JP 9-225267 A) discloses a catalyst which is obtained using a spinel-type oxide, the catalyst trapping HC at 200° C. or lower and being used in NOx purification by reduction reaction or the like at a high temperature equal to or higher than 200° C.

CITATION LIST

Patent Document

Patent Document 1: JP 2011-140011 A
Patent Document 2: JP 2008-156130 A
Patent Document 3: JP 2009-225267 A

DISCLOSURE OF THE INVENTION

Problem to be Solved by the Invention

Many of conventional catalyst compositions using other metals different from precious metals as a catalytically active component had a problem in that a catalytic activity such as an oxidation activity of hydrocarbon (THC) or carbon monoxide (CO) was insufficient. In addition, there had a problem in that a catalytic activity was significantly reduced since the catalytically active component exists in a carrier and the like as a solid solution or is sintered by a thermal durability treatment.

Therefore, the invention relates to a catalyst composition using other metals different from precious metals as a catalytically active component and is to propose a novel catalyst composition for exhaust gas purification and a catalyst using the same, which have an excellent effect on a catalytic activity, in particular, on a treatment activity of HC or CO and are not reduced in catalytic activity even after the thermal durability treatment.

Means for Solving Problem

The invention is to propose a catalyst composition for exhaust gas purification containing catalyst particles having a constitution in which Cu and a transition metal A including at least one of Cr, Fe, Mn, Co, Ni, Zr, and Ag are supported on ceria ($CeO_2$) particles and a catalyst using the same.

Effect of the Invention

According to the catalyst composition for exhaust gas purification and the catalyst using the same which are proposed by the invention, since a combination of Cu and the transition metal A including at least one of Cr, Fe, Mn, Co, Ni, Zr, and Ag is supported on the ceria ($CeO_2$) particles and thus the precious metals cannot be used or precious metal usage can be significantly reduced, it can be provided at low cost. Furthermore, the catalytic activity after the thermal durability treatment, in particular, oxidation activity of HC and CO is also excellent.

MODE(S) FOR CARRYING OUT THE INVENTION

Next, embodiments of the invention will be described. However, the invention is not intended to be limited to the embodiments described below.

<Present Catalyst Composition>

An exhaust gas purification catalyst composition (referred to as a "present catalyst composition") according to an embodiment is a composition containing catalyst particles (referred to as "present catalyst particles") having a constitution in which Cu and a transition metal A including at least one of Cr, Fe, Mn, Co, Ni, Zr, and Ag are supported on ceria ($CeO_2$) particles.

(Present Catalyst Particles)

As described above, the present catalyst particles are catalyst particles having a constitution in which Cu and the transition metal A are supported on the ceria ($CeO_2$) particles.

(Ceria Particles)

A specific surface area of the ceria particles constituting the present catalyst particles is not particularly limited. As a guideline, the specific surface area of the ceria particles is preferably 20 to 200 m$^2$/g, more preferably 40 m$^2$/g or more or 160 m$^2$/g or less, and most preferably 85 m$^2$/g or more as a BET specific surface area.

Preferably, the ceria particles are contained in the present catalyst composition at a rate of 5 to 90 mass %.

CO and THC can be sufficiently purified under a fuel-rich atmosphere when the ceria particles are contained in the present catalyst composition at a rate of 5 mass % or more, and adhesion with a substrate can be reliably secured when the content of the ceria particles is 90 mass % or less.

From such a viewpoint, the ceria particles are preferably contained in the present catalyst composition at a rate of 5 to 90 mass % and more preferably at a rate of 13 mass % or more or 40 mass % or less.

(Catalytically Active Component)

The present catalyst particles are contained in a state where Cu and the transition metal A including at least one of Cr, Fe, Mn, Co, Ni, Zr, and Ag are supported on the ceria ($CeO_2$) particles, as a catalytically active component.

Examples of the transition metal A may include one selected from the group consisting of Cr, Fe, Mn, Co, Ni, Zr, and Ag or may a combination of two or more of these elements.

Among these examples, a combination of one or two or more selected from the group consisting of Cr, Mn, Co, Zr, and Ni is particularly preferred in view of the fact that a melting point is relatively high.

The Cu and the transition metal A are supported on the ceria ($CeO_2$) particles in a state of an each oxide or a metal or in a state of a composite oxide thereof.

Before the thermal durability treatment, for example, in a state (Fresh) before the thermal durability treatment for heating to 400° C. or higher, the Cu and the transition metal A are supported on the ceria ($CeO_2$) particles in the state of an oxide.

On the other hand, after the thermal durability treatment, for example, in a state (Aged) after the thermal durability treatment for heating to 800° C. or higher, the Cu and the transition metal A are supported on the ceria ($CeO_2$) particles in the state of an oxide or in a state of a composite oxide thereof.

At this time, when the thermal durability treatment is carried out by heating under a reducing atmosphere (for example, nitrogen atmosphere), for example, in a case where the transition metal A is Fe or Mn, Cu and the transition metal A are turned into a state of a delafossite-type oxide and are supported on the ceria ($CeO_2$) particles.

Further, whether it is in a state of the delafossite-type oxide can be confirmed by identifying peaks through an X-ray diffraction analysis (XRD). For example, in the case where the transition metal A is Fe or Mn, the transition metal A is turned into the delafossite-type oxide by heating at 800° C. for 5 hours in nitrogen gas of 100%.

On the other hand, when the thermal durability treatment is carried out by heating under the oxidizing atmosphere, the transition metal A is supported on the ceria ($CeO_2$) particles in different states according to the kind of the transition metal A.

For example, in the case where the transition metal A is Mn, when the thermal durability treatment is carried out by heating under the oxidizing atmosphere, Cu and Mn are turned into a non-stoichiometry spinel ($Cu_{1.5}Mn_{1.5}O_4$) state and are then supported on the ceria ($CeO_2$) particles; in the case where the transition metal A is Fe, Cu and Fe are turned into a spinel-type oxide ($CuFe_2O_4$) state and are then supported on the ceria ($CeO_2$) particles; and in the case where the transition metal A is Ni or Ag, Cu and Ni are supported on the ceria ($CeO_2$) particles in a state of an each oxide (CuO—NiO) and Cu and Ag are supported on the ceria ($CeO_2$) particles in a state of an each oxide or a metal (CuO—$Ag_2$O or CuO—Ag).

However, in any case, excessive quantities of Cu and transition metal A exist in the state of an oxide or a metal.

With respect to the content (that is, supported amount) of Cu, the content ratio of Cu to the ceria ($CeO_2$) particles obtained by the following Formula (1) is preferably 0.05 to 20 mass %, more preferably 0.10 mass % or more or 15 mass % or less, and most preferably 0.15 mass % or more or 10 mass % or less.

Content ratio of Cu={amount of Cu/(amount of ceria particles+amount of Cu+amount of transition metal $A$)}×100   (1)

With respect to the content (that is, supported amount) of the transition metal A, the content ratio of transition metal A to the ceria ($CeO_2$) particles obtained by the following Formula (2) is preferably 0.05 to 20 mass %, more preferably 0.1 mass % or more or 10 mass % or less, and most preferably 0.2 mass % or more or 5 mass % or less.

Content ratio of transition metal $A$={amount of transition metal $A$/(amount of ceria particles+amount of Cu+amount of transition metal $A$)}×100   (2)

Above all, with respect to the content (that is, supported amount) of Mn, the content ratio of transition metal A to the ceria ($CeO_2$) particles obtained by the following Formula (2) is preferably 0.05 to 20 mass %, more preferably 0.1 mass % or more or 10 mass % or less, and most preferably 0.5 mass % or more or 1.5 mass % or less.

With respect to the content (that is, supported amount) of Ni, the content ratio of transition metal A to the ceria ($CeO_2$) particles obtained by the following Formula (2) is preferably 0.05 to 20 mass %, more preferably 0.1 mass % or more or 10 mass % or less, and most preferably 0.2 mass % or more or 1.0 mass % or less.

Moreover, the present catalyst particles may contain catalytically active components, for example, precious metals different from Cu and the transition metal A. When the present catalyst particles contain the precious metals, oxidation activity of CO and HC can be further improved.

Examples of the precious metals may include metals such as platinum, rhodium, or palladium.

(Stabilizer and Other Components)

The present catalyst particles may contain a stabilizer. Examples of these types of stabilizers may include an alkaline-earth metal or an alkaline metal. Preferably, the stabilizer can be one or two or more of metals selected from a group consisting of magnesium, barium, calcium, and strontium, and more preferably, the stabilizer can be one or two or more of metals selected from a group consisting of strontium and barium.

(Other Components Capable of being Contained in Present Catalyst Composition)

The present catalyst composition may contain other components different from the present catalyst particles.

For example, the present catalyst composition may contain catalyst particles, in which the catalytically active component such as the precious metal is supported on inorganic porous particles, OSC material particles and the like.

Examples of the inorganic porous particles may include a porous material of the compound selected from a group consisting of silica, ceria, ceria-zirconia, alumina, or titania and more specifically a porous material consisting of the compound selected from alumina, silica, silica-alumina, alumino-silicates, alumina-zirconia, alumina-chromia, and alumina-ceria.

The OSC material particles may be particles consisting of materials having an oxygen storage capacity (OSC). For example, the OSC material particles may include cerium compound particles, zirconium compound particles, and ceria-zirconia composite oxide particles.

(Production Method of Present Catalyst Composition)

A ceria ($CeO_2$) powder, a copper compound, a compound of the transition metal A, water, and other raw materials as needed are mixed and stirred with each other to obtain slurry, and then the present catalyst composition can be obtained by drying the obtained slurry.

However, it is not intended to be limited to such production method. The present catalyst particles and the present catalyst composition can be produced by, for example, an arc plasma (AP) method.

An arc plasma generator is generally configured by a cathode (a base metal of Cu and the transition metal A in this example) as a base metal, an anode, a trigger electrode, an insulator and the like. A high-voltage pulse is applied between the base metal as the cathode and the trigger electrode between which the insulator is sandwiched to cause a creeping discharge, electric charges charged in a capacitor between the cathode and the anode are discharged by the creeping discharge, and precious metals of the cathode are turned into plasma and are jetted forward, thereby being precipitated onto the surface of a powder carrier as nanoparticles.

The arc plasma (AP) method has characteristics capable of controlling a size and a precipitation density of precipitation particles by discharge energy. When the discharge is performed at high energy, molar numbers of the precious metals turned once into the plasma are increased, but the size of the precipitation particles becomes large. Meanwhile, when the discharge is performed at low energy, the size of the precipitation particles becomes finer, but plasma generation probability is reduced.

As examination results of a variety of energy, it was found that high dispersion of nanoparticles was most uniformly obtained by discharging energy of about 3 J to 5 J. The supported amount can be controlled by the number of times of discharges.

When the present catalyst composition is prepared by the arc plasma (AP) method, it is possible to obtain the present catalyst particles having a constitution in which an oxide of Cu and an oxide of the transition metal A are supported on the ceria ($CeO_2$) particles in proximity to each other.

Then, when the present catalyst composition is prepared by the arc plasma (AP) method, it was found that a surprising effect could be obtained in which the catalytic activity after the thermal durability treatment was improved compared to that before the thermal durability treatment.

<Present Catalyst>

Next, a catalyst for exhaust gas purification (hereinafter, referred to as a "present catalyst") will be described, which can be prepared using the present catalyst composition.

The catalyst can be prepared by supporting the present catalyst composition on a honeycomb substrate.

In addition, the catalyst can be prepared by forming the present catalyst composition in a pellet shape.

As a specific configuration example of the present catalyst, for example, the present catalyst may include a catalyst provided with a catalyst layer which is formed through processes of preparing a slurry by mixing the present catalyst composition with water and other components, stirring the mixed present catalyst composition using a ball mill, and applying the slurry on a substrate by a wash coat.

In addition, another example of the present catalyst may include a catalyst provided with a catalyst layer which is formed on the surface of the substrate through processes of preparing a slurry by mixing the present catalyst composition with water and other components and stirring the mixed present catalyst composition using the ball mill, immersing the substrate into the slurry, and then pulling up the immersed substrate to calcine it.

However, the method of producing the present catalyst can employ all of the known methods, and is not limited to the above examples.

(Substrate)

Examples of the substrate material used in the present catalyst may include refractory materials such as ceramics and metal materials.

Examples of the ceramic substrate material may include a refractory ceramic material, for example, cordierite, cordierite-alpha alumina, silicon nitride, zircon mullite, spodumene, alumina-silica magnesia, zircon silicate, sillimanite, magnesium silicate, zircon, petalite, alpha alumina, alumino-silicates, and the like.

Examples of the metal substrate material may include a refractory metal, for example, other suitable corrosion-resistant alloys based on stainless steel or iron.

The shape of the substrate may include a honeycomb shape, a pellet shape, or a spherical shape.

The honeycomb material may use, for example, a cordierite material such as the ceramics. In addition, the honeycomb material may use the honeycomb formed of a metal material such as ferritic stainless steel.

In a case of using the substrate of the honeycomb shape, for example, it is possible to use a monolithic substrate which has a plurality of minute gas flow passages, that is, channels parallel to each other inside the substrate so that fluid flows through the inside of the substrate. At this time, catalyst compositions may be coated on the inner wall surface of each channel of the monolithic substrate by the wash coat to form the catalyst layer.

(Catalyst Layer)

The catalyst layer may be stacked with one or two or more in a vertical direction, and another catalyst layer may be formed in a flowing direction of an exhaust gas.

(Other Components)

The catalyst may contain known additive components such as a binder component.

Examples of the binder component may include an inorganic binder, for example, an aqueous solution such as alumina sol, silica sol, or zirconia sol. These can take a type of an inorganic oxide when being calcined.

<Explanation of Expressions>

In this specification, when the expression "X to Y" (X and Y are arbitrary numbers) is used, unless otherwise explicitly mentioned, the meaning of "X or greater but Y or less" is included and at the same time, the meaning of "preferably greater than X" or "preferably less than Y" is included.

In addition, the expression "X or greater" (X is an arbitrary number) or "Y or less" (Y is an arbitrary number) includes the intention of "it is preferable to be greater than X" or "it is preferable to be less than Y".

EXAMPLES

Hereinafter, the invention will be described in detail based on the following Examples and Comparative Examples.

Comparative Example 1

A catalyst composition (Fresh) including a constitution in which Cu oxide was supported on ceria particles was obtained in such a manner that 99 parts by mass of $CeO_2$, 1 part by mass of copper acetate monohydrate in terms of Cu metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

An XRD measurement was performed on the catalyst composition (Aged), and, as a result, a peak of CuO was detected simultaneously with a peak of $CeO_2$.

Comparative Example 2

A catalyst composition (Fresh) including a constitution in which Cu oxide was supported on ceria particles was obtained in such a manner that 90 parts by mass of $CeO_2$, 10 parts by mass of copper acetate monohydrate in terms of Cu metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

An XRD measurement was performed on the catalyst composition (Aged), and, as a result, a peak of CuO was detected simultaneously with a peak of $CeO_2$.

Example 1

A catalyst composition (Fresh) including a constitution in which Cu oxide and Mn oxide were supported on ceria particles was obtained in such a manner that 95 parts by mass of $CeO_2$, 2.5 parts by mass of copper acetate monohydrate in terms of Cu metal, 2.5 parts by mass of manganese nitrate hexahydrate in terms of Mn metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

An XRD measurement was performed on the catalyst composition (Aged), and, as a result, a peak of $Cu_{1.5}Mn_{1.5}O_4$ and $Mn_2O_3$ was detected simultaneously with a peak of $CeO_2$.

Example 2

A catalyst composition (Fresh) including a constitution in which Cu oxide and Mn oxide were supported on ceria particles was obtained in such a manner that 95 parts by mass of $CeO_2$, 4 parts by mass of copper acetate monohydrate in terms of Cu metal, 1 part by mass of manganese nitrate hexahydrate in terms of Mn metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

An XRD measurement was performed on the catalyst composition (Aged), and, as a result, a peak of $Cu_{1.5}Mn_{1.5}O_4$ and $Mn_2O_3$ was detected simultaneously with a peak of $CeO_2$.

Example 3

A catalyst composition (Fresh) including a constitution in which Cu oxide and Mn oxide were supported on ceria particles was obtained in such a manner that 95 parts by mass of $CeO_2$, 1 part by mass of copper acetate monohydrate in terms of Cu metal, 4 parts by mass of manganese nitrate hexahydrate in terms of Mn metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

An XRD measurement was performed on the catalyst composition (Aged), and, as a result, a peak of $Cu_{1.5}Mn_{1.5}O_4$ and $Mn_2O_3$ was detected simultaneously with a peak of $CeO_2$.

Example 4

A catalyst composition (Fresh) including a constitution in which Cu oxide and Ni oxide were supported on ceria particles was obtained in such a manner that 95 parts by mass of $CeO_2$, 2.5 parts by mass of copper acetate monohydrate in terms of Cu metal, 2.5 parts by mass of nickel nitrate hexahydrate in terms of Ni metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

An XRD measurement was performed on the catalyst composition (Aged), and, as a result, a peak of CuO and NiO was detected simultaneously with a peak of $CeO_2$.

Example 5

A catalyst composition (Fresh) including a constitution in which Cu oxide and Ni oxide were supported on ceria particles was obtained in such a manner that 95 parts by mass of $CeO_2$, 4 parts by mass of copper acetate monohydrate in terms of Cu metal, 1 part by mass of nickel nitrate hexahydrate in terms of Ni metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

An XRD measurement was performed on the catalyst composition (Aged), and, as a result, a peak of CuO and NiO was detected simultaneously with a peak of $CeO_2$.

Example 6

A catalyst composition (Fresh) including a constitution in which Cu oxide and Ni oxide were supported on ceria particles was obtained in such a manner that 95 parts by mass of $CeO_2$, 1 part by mass of copper acetate monohydrate in terms of Cu metal, 4 parts by mass of nickel nitrate hexahydrate in terms of Ni metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

An XRD measurement was performed on the catalyst composition (Aged), and, as a result, a peak of CuO and NiO was detected simultaneously with a peak of $CeO_2$.

Example 7

A catalyst composition (Fresh) including a constitution in which Cu oxide, Ag oxide, and Ag metal were supported on ceria particles was obtained in such a manner that 95 parts by mass of $CeO_2$, 2.5 parts by mass of copper acetate monohydrate in terms of Cu metal, 2.5 parts by mass of silver nitrate in terms of Ag metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

Example 8

A catalyst composition (Fresh) including a constitution in which Cu oxide and Co oxide were supported on ceria particles was obtained in such a manner that 95 parts by mass of $CeO_2$, 2.5 parts by mass of copper acetate monohydrate in terms of Cu metal, 2.5 parts by mass of cobalt nitrate hexahydrate in terms of Co metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

Example 9

A catalyst composition (Fresh) including a constitution in which Cu oxide and Co oxide were supported on ceria particles was obtained in such a manner that 95 parts by mass of $CeO_2$, 2.5 parts by mass of copper acetate monohydrate in terms of Cu metal, 2.5 parts by mass of iron nitrate nonahydrate in terms of Fe metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 800° C. for five hours under air atmosphere.

An XRD measurement was performed on the catalyst composition (Aged), and, as a result, a peak of $CuFe_2O_4$ was detected simultaneously with a peak of $CeO_2$.

(Catalyst Performance Evaluation)

With respect to the catalyst compositions (Aged) obtained in Comparative Examples 1 and 2 and Examples 1 to 9, purification performance of a simulation exhaust gas was measured using a fixed bed flow type reactor.

A catalyst composition (powder) of 0.1 g was set in a reaction tube, and then the simulation exhaust gas was introduced into the catalyst powder at the following state, that is, 10° C./min, CO: 500 ppm, $C_3H_6$: 500 ppmC, NO: 200 ppm, $O_2$: 4.8%, $CO_2$: 10%, $H_2O$: 10%, $N_2$: balance, and a total flow rate of 1000 cc/min.

After a temperature was raised up to 500° C. at a temperature rising rate of 10° C./min, a pre-treatment was carried out by holding the temperature of 500° C. for 10 minutes. Thereafter, the purification performance of the simulation exhaust gas was measured by raising a temperature from 100° C. to 500° C. at the temperature rising rate of 10° C./min after once cooling, outlet gas components were measured using HC analyzer ("VMF-1000F" manufactured by Shimadzu Co.), and a temperature (T20) at which HC was purified by 20% was measured.

TABLE 1

| | | HC (T20): ° C. |
|---|---|---|
| Comparative Example 1 | 1 wt % Cu/$CeO_2$ | 474.0 |
| Comparative Example 2 | 10 wt % Cu/$CeO_2$ | 442.2 |
| Example 1 | (2.5 wt % Cu + 2.5 wt % Mn)/$CeO_2$ | 323.8 |
| Example 2 | (4 wt % Cu + 1 wt % Mn)/$CeO_2$ | 371.7 |
| Example 3 | (1 wt % Cu + 4 wt % Mn)/$CeO_2$ | 402.2 |
| Example 4 | (2.5 wt % Cu + 2.5 wt % Ni)/$CeO_2$ | 433.4 |
| Example 5 | (4 wt % Cu + 1 wt % Ni)/$CeO_2$ | 409.1 |
| Example 6 | (1 wt % Cu + 4 wt % Ni)/$CeO_2$ | 424.9 |
| Example 7 | (2.5 wt % Cu + 2.5 wt % Ag)/$CeO_2$ | 396.1 |
| Example 8 | (2.5 wt % Cu + 2.5 wt % Co)/$CeO_2$ | 376.1 |
| Example 9 | (2.5 wt % Cu + 2.5 wt % Fe)/$CeO_2$ | 430.8 |

From Table 1, as compared to the case where only Cu was supported on the ceria ($CeO_2$) particles, it was found that the purification performance of HC was improved in the case where a combination of Cu and other transition metals was supported on the ceria ($CeO_2$) particles.

When the catalyst particles obtained in Examples 1 to 9 were measured by an XRD, Cu and the other transition metals were supported on the ceria ($CeO_2$) particles in a state of an each oxide or a metal before the thermal durability treatment.

Meanwhile, when heating and thermal durability treatment were carried out under a reducing atmosphere, it was found that Cu and other transition metals were supported on the ceria ($CeO_2$) particles in a state of a delafossite-type oxide.

In addition, when the heating and thermal durability treatment were carried out under an oxidizing atmosphere, it was found that Cu and Mn were supported on the ceria ($CeO_2$) particles in a state of a non-stoichiometry spinel ($Cu_{1.5}Mn_{1.5}O_4$); Cu and Fe were supported on the ceria ($CeO_2$) particles in a state of a spinel-type oxide ($CuFe_2O_4$); Cu and Ni were supported on the ceria ($CeO_2$) particles in a state of an each oxide (CuO—NiO); and Cu and Ag were supported on the ceria ($CeO_2$) particles in a state of an each oxide (CuO—$Ag_2O$) and a metal (CuO—Ag).

Even in any case, it was also found that excessive quantities of Cu and transition metal A exist in the state of an oxide or a metal.

Furthermore, from the above test results and test results which have been made, with respect to the content (that is, supported amount) of Cu, it was considered that the content ratio of Cu to the ceria ($CeO_2$) particles obtained by the following Formula (1) was preferably 0.05 to 20 mass %, more preferably 0.10 mass % or more or 15 mass % or less, and most preferably 0.15 mass % or more or 10 mass % or less.

Content ratio of Cu={amount of Cu/(amount of ceria particles+amount of Cu+amount of transition metal $A$)}×100    (1)

On the other hand, with respect to the content (that is, supported amount) of the transition metal A, it was considered that the content ratio of transition metal A to the ceria ($CeO_2$) particles obtained by the following Formula (2) was preferably 0.05 to 20 mass %, more preferably 0.1 mass % or more or 10 mass % or less, and most preferably 0.2 mass % or more or 5 mass % or less.

Content ratio of transition metal $A$={amount of transition metal $A$/(amount of ceria particles+amount of Cu+amount of transition metal $A$)}×100    (2)

Above all, with respect to the content (that is, supported amount) of Mn, it was considered that the content ratio of transition metal A to the ceria ($CeO_2$) particles obtained by the following Formula (2) was preferably 0.05 to 20 mass %, more preferably 0.1 mass % or more or 10 mass % or less, and most preferably 0.5 mass % or more or 1.5 mass % or less.

With respect to the content (that is, supported amount) of Ni, it was considered that the content ratio of transition metal A to the ceria ($CeO_2$) particles obtained by the following Formula (2) was preferably 0.05 to 20 mass %, more preferably 0.1 mass % or more or 10 mass % or less, and most preferably 0.2 mass % or more or 1.0 mass % or less.

Comparative Examples 3 to 7 and Examples 10 to 13

In Comparative Examples 3 to 7 and Examples 10 to 13, a catalyst composition was prepared by arc plasma (AP) method.

Using an arc plasma (AP) generator ("ARL-300" manufactured by Ulvac Inc.) attached with various cylindrical metal cast body (10 mm×17 mm, purity of 99.9% or more, manufactured by Furuya Metal Co., Ltd.) as a cathode, $CeO_2$ as a carrier was put in a container in a vacuum chamber and a gas was exhausted by an oil rotary vacuum pump (RP) and a turbo molecular pump (TMP) under conditions indicated in Table 2. Under plasma irradiation, the container was rotated and thus powders (samples) were stirred by scraper. Further, $CeO_2$ powders having a specific surface area of 120 $m^2/g$ was used.

In order to precipitate a predetermined amount of metal nanoparticles onto the carrier, the preparation was made at a room temperature by generating an arc discharge at a frequency of 1 Hz or 2 Hz with a peak current of 2 kA and a pulse width of 0.2 ms while stirring the powders by rotating each container.

After the plasma irradiation is finished, the vacuum chamber was opened to atmospheric pressure and the catalyst composition (Fresh) prepared while stirring the powders by rotating each container was taken from the container. Thereafter, a catalyst composition (Aged) was obtained in such a manner that the catalyst composition (Fresh) was subjected to a thermal durability treatment so as to be calcined at a temperature of 900° C. for 25 hours under water vapor of 10%/air atmosphere using an electric furnace. Detailed conditions refer to Table 2 described below.

TABLE 2

| | Cathode | Carrier | Capacity of capacitor/ μF | Discharge voltage/V | Discharge frequency/ Hz | Number of discharges/ shot | Irradiation time/h | Stirring speed of carrier powder/kpa |
|---|---|---|---|---|---|---|---|---|
| Comparative Example 3 | Fe | $CeO_2$ (2 g) | 360 | 125 | 1 | 26000 | 7.2 | 60 |
| Comparative Example 4 | Cu | $CeO_2$ (2 g) | 363 | 125 | 1 | 26000 | 7.2 | 60 |
| Comparative Example 5 | Ni | $CeO_2$ (2 g) | 360 | 125 | 1 | 26000 | 7.2 | 60 |
| Comparative Example 6 | Cr | $CeO_2$ (2 g) | 360 | 125 | 1 | 26000 | 7.2 | 60 |
| Comparative Example 7 | Zr | $CeO_2$ (2 g) | 360 | 125 | 1 | 26000 | 7.2 | 60 |
| Example 10 | Fe—Cu | $CeO_2$ (2 g) | 360 | 125 | 1 | 20000 | 5.6 | 60 |
| Example 11 | Ni—Cu | $CeO_2$ (2 g) | 360 | 125 | 1 | 20000 | 5.6 | 60 |
| Example 12 | Cr—Cu | $CeO_2$ (2 g) | 360 | 125 | 1 | 20000 | 5.6 | 60 |
| Example 13 | Zr—Cu | $CeO_2$ (2 g) | 360 | 125 | 1 | 20000 | 5.6 | 60 |

TABLE 3

| | | Amount supported on carrier/wt % | |
|---|---|---|---|
| Comparative Example 3 | Fe/CeO$_2$ | 0.70 | |
| Comparative Example 4 | Cu/CeO$_2$ | 0.74 | |
| Comparative Example 5 | Ni/CeO$_2$ | 0.74 | |
| Comparative Example 6 | Cr/CeO$_2$ | 0.70 | |
| Comparative Example 7 | Zr/CeO$_2$ | 1.04 | |
| Example 10 | Fe—Cu/CeO$_2$ | 0.18 (Fe) | 0.11 (Cu) |
| Example 11 | Ni—Cu/CeO$_2$ | 0.17 (Ni) | 0.13 (Cu) |
| Example 12 | Cr—Cu/CeO$_2$ | 0.20 (Cr) | 0.10 (Cu) |
| Example 13 | Zr—Cu/CeO$_2$ | 0.22 (Zr) | 0.13 (Cu) |

In each of Examples, the supported amount of each element was calculated from analytical values of the XRF.

(Catalyst Performance Evaluation)

With respect to each of the catalyst compositions (Fresh) and the catalyst compositions (Aged) obtained in Comparative Examples 3 to 7 and Examples 10 to 13, purification performance of a simulation exhaust gas was measured using a fixed bed flow type reactor.

A catalyst powder of 0.1 g was set in a reaction tube, and then the simulation exhaust gas was introduced into the catalyst powder at the following state, that is, 10° C./min, CO: 1000 ppm, O$_2$: 1.25%, He: balance, and W/F of $5.0 \times 10^{-4}$ g/min·cm$^{-3}$.

After a temperature was raised up to 500° C. at a temperature rising rate of 10° C./min, a pre-treatment was carried out by holding the temperature of 500° C. for 10 minutes. Thereafter, the purification performance of the simulation exhaust gas was measured by raising a temperature from 100° C. to 500° C. at the temperature rising rate of 10° C./min after once cooling, outlet gas components were measured using CO/NO analyzer ("PG240" manufactured by Horiba Ltd.), and a temperature (T50) at which CO was purified by 50% was measured.

TABLE 4

| | | CO (T50): ° C. | |
|---|---|---|---|
| | | Fresh | Aged |
| Comparative Example 3 | Fe/CeO$_2$ | 332 | 400> |
| Comparative Example 4 | Cu/CeO$_2$ | 155 | 252 |
| Comparative Example 5 | Ni/CeO$_2$ | 150 | 220 |
| Comparative Example 7 | Zr/CeO$_2$ | 254 | 400> |
| Example 10 | Fe—Cu/CeO$_2$ | 290 | 152 |
| Example 11 | Ni—Cu/CeO$_2$ | 190 | 146 |
| Example 12 | Cr—Cu/CeO$_2$ | 296 | 117 |
| Example 13 | Zr—Cu/CeO$_2$ | 279 | 150 |

From the results indicated in Table 4, as compared to the case where only Cu or one element of the transition metals was supported on the ceria (CeO$_2$) particles, it was found that the purification performance of CO was improved in the case where a combination of Cu and other transition metals was supported on the ceria (CeO$_2$) particles.

Even more surprisingly, it was found that the purification performance of CO after the thermal durability treatment (Aged) was improved compared to that before thermal durability treatment (Fresh) when the combination of Cu and other transition metals was supported on the ceria (CeO$_2$) particles by the arc plasma (AP) method.

In addition, it was found that an oxide of Cu and an oxide of the transition metal A were supported on the ceria (CeO$_2$) particles in proximity to each other when the present catalyst composition is prepared by the arc plasma (AP) method.

Example 14

A catalyst composition (Fresh) including a constitution in which Cu oxide and Fe oxide were supported on ceria particles was obtained in such a manner that 99.6 parts by mass of CeO$_2$, 0.2 parts by mass of iron nitrate in terms of Cu metal, 0.2 parts by mass of iron nitrate nonahydrate in terms of Fe metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 900° C. for 25 hours under water vapor of 10%/air atmosphere using an electric furnace.

Example 15

A catalyst composition (Fresh) including a constitution in which Cu oxide and Fe oxide were supported on ceria particles was obtained in such a manner that 80 parts by mass of CeO$_2$, 10 parts by mass of iron nitrate in terms of Cu metal, 10 parts by mass of iron nitrate nonahydrate in terms of Fe metal, and an appropriate amount of ion exchange water were mixed and stirred to make slurry and then the slurry was subjected to drying.

A catalyst composition (Aged) was obtained in such a manner that the catalyst composition (Fresh) was subjected to a thermal durability treatment so as to be calcined at 900° C. for 25 hours under water vapor of 10'/air atmosphere using an electric furnace.

(Catalyst Performance Evaluation)

With respect to the catalyst compositions (Aged) obtained in Examples 14 and 15 and Comparative Examples 3 and 4, purification performance of a simulation exhaust gas was measured using a fixed bed flow type reactor.

A catalyst powder of 0.1 g was set in a reaction tube, and then the simulation exhaust gas was introduced into the catalyst powder at the following state, that is, 10° C./min, CO: 1000 ppm, O$_2$: 1.25%, He: balance, and W/F of $5.0 \times 10^{-4}$ g/min·cm$^{-3}$.

After a temperature was raised up to 500° C. at a temperature rising rate of 10° C./min, a pre-treatment was carried out by holding the temperature of 500° C. for 10 minutes. Thereafter, the purification performance of the simulation exhaust gas was measured by raising a temperature from 100° C. to 500° C. at the temperature rising rate of 10° C./min after once cooling, outlet gas components were measured using CO/NO analyzer ("PG240" manufactured by Horiba Ltd.), and a temperature (T50) at which CO was purified by 50% was measured.

TABLE 5

| | | CO (T50): ° C. |
|---|---|---|
| Example 14 | (0.2 wt % Cu + 0.2 wt % Fe)/CeO$_2$ | 220 |
| Example 15 | (10 wt % Cu + 10 wt % Fe)/CeO$_2$ | 242 |
| Comparative Example 3 | Fe/CeO$_2$ | 400> |
| Comparative Example 4 | Cu/CeO$_2$ | 252 |

From the results indicated in Table 5, it was found that the catalyst compositions (Aged) obtained in Examples 14 and 15 had excellent purification performance of CO as compared to that of the catalyst compositions (Aged) obtained in Comparative Examples 3 and 4.

Thus, with respect to the catalyst composition containing the catalyst particles having the constitution in which Cu and the transition metal A including at least one of Cr, Fe, Mn, Co, Ni, Zr, and Ag are supported on the ceria ($CeO_2$) particles, it was found that the catalytic activity was high in the range where the Cu and the transition metal A was supported with high concentration.

The invention claimed is:

1. A catalyst composition for exhaust gas purification comprising catalyst particles having a constitution in which Cu and a transition metal A including at least one of Ni and Zr are supported on ceria ($CeO_2$) particles by an arc plasma method.

2. The catalyst composition for exhaust gas purification according to claim 1, wherein a content ratio of the transition metal A to the ceria particles obtained by the following Formula (2) is 0.05 to 20 mass %, Content ratio of transition metal $A$={amount of transition metal $A$/(amount of ceria particles+ amount of Cu+amount of transition metal $A$)}× 100. (2)

3. The catalyst composition for exhaust gas purification according to claim 1, wherein a content ratio of the Cu to the ceria ($CeO_2$) particles obtained by the following formula (1) is 0.05 to 20 mass % and a content ratio of the transition metal A to the ceria ($CeO_2$) particles obtained by the following formula (2) is 0.05 to 20 mass %, Content ratio of Cu={amount of Cu/(amount of ceria particles+amount of Cu+amount of transition metal $A$)}×100 (1)

Content ratio of transition metal $A$={amount of transition metal $A$/(amount of ceria particles+ amount of Cu+amount of transition metal $A$)}× 100. (2)

4. A catalyst for exhaust gas purification comprising a constitution in which the catalyst composition for exhaust gas purification according to claim 1 is supported on a honeycomb substrate.

5. A catalyst for exhaust gas purification comprising a constitution in which the catalyst composition for exhaust gas purification according to claim 1 is formed in a pellet shape.

6. The catalyst composition for exhaust gas purification according to claim 1, wherein Cu, Ni and Zr are supported on the ceria ($CeO_2$) particles.

7. The catalyst composition for exhaust gas purification according to claim 1, wherein Cu and Ni are supported on the ceria ($CeO_2$) particles.

8. The catalyst composition for exhaust gas purification according to claim 1, wherein Cu and Zr are supported on the ceria ($CeO_2$) particles.

9. The catalyst composition for exhaust gas purification according to claim 1, wherein Cu and the transition metal A are supported on the ceria ($CeO_2$) particles in a state of a composite oxide of Cu and the transition metal A.

10. The catalyst composition for exhaust gas purification according to claim 1, further comprising another catalyst particle in which a precious metal is supported on an inorganic porous particle, the another catalyst particle being different from the catalyst particles having the constitution in which Cu and the transition metal A including at least one of Ni and Zr are supported on ceria ($CeO_2$) particles by the arc plasma method.

11. A catalyst composition for exhaust gas purification containing catalyst particles having a constitution in which Cu and a transition metal A including at least one of Ni and Zr are supported on ceria ($CeO_2$) particles by an arc plasma method, wherein the Cu and the transition metal A of the catalyst particles are supported on the ceria ($CeO_2$) particles in a state of an each oxide or a metal or in a state of a composite oxide thereof.

12. The catalyst composition for exhaust gas purification according to claim 11, wherein a content ratio of the transition metal A to the ceria particles obtained by the following Formula (2) is 0.05 to 20 mass %, Content ratio of transition metal $A$={amount of transition metal $A$/(amount of ceria particles+ amount of Cu+amount of transition metal $A$)}× 100. (2)

13. The catalyst composition for exhaust gas purification according to claim 11, wherein a content ratio of the Cu to the ceria ($CeO_2$) particles obtained by the following formula (1) is 0.05 to 20 mass % and a content ratio of the transition metal A to the ceria ($CeO_2$) particles obtained by the following formula (2) is 0.05 to 20 mass %, Content ratio of Cu={amount of Cu/(amount of ceria particles+amount of Cu+amount of transition metal $A$)}×100 (1)

Content ratio of transition metal $A$={amount of transition metal $A$/(amount of ceria particles+ amount of Cu+amount of transition metal $A$)}× 100. (2)

14. A catalyst for exhaust gas purification comprising a constitution in which the catalyst composition for exhaust gas purification according to claim 11 is supported on a honeycomb substrate.

15. A catalyst for exhaust gas purification comprising a constitution in which the catalyst composition for exhaust gas purification according to claim 11 is formed in a pellet shape.

16. The catalyst composition for exhaust gas purification according to claim 11, wherein Cu, Ni and Zr are supported on the ceria ($CeO_2$) particles.

17. The catalyst composition for exhaust gas purification according to claim 11, wherein Cu and Ni are supported on the ceria ($CeO_2$) particles.

18. The catalyst composition for exhaust gas purification according to claim 11, wherein Cu and Zr are supported on the ceria ($CeO_2$) particles.

19. The catalyst composition for exhaust gas purification according to claim 11, wherein Cu and the transition metal A are supported on the ceria ($CeO_2$) particles in a state of a composite oxide of Cu and the transition metal A.

20. The catalyst composition for exhaust gas purification according to claim 1, further comprising an OSC material particle including at least one selected from a group consisting of a cerium compound particle, a zirconium compound particle and a ceria-zirconia composite oxide particle, the OSC material particle being different from the catalyst particles having the constitution in which Cu and the transition metal A including at least one of Ni and Zr are supported on ceria ($CeO_2$) particles by the arc plasma method.

* * * * *